Patented Mar. 16, 1937

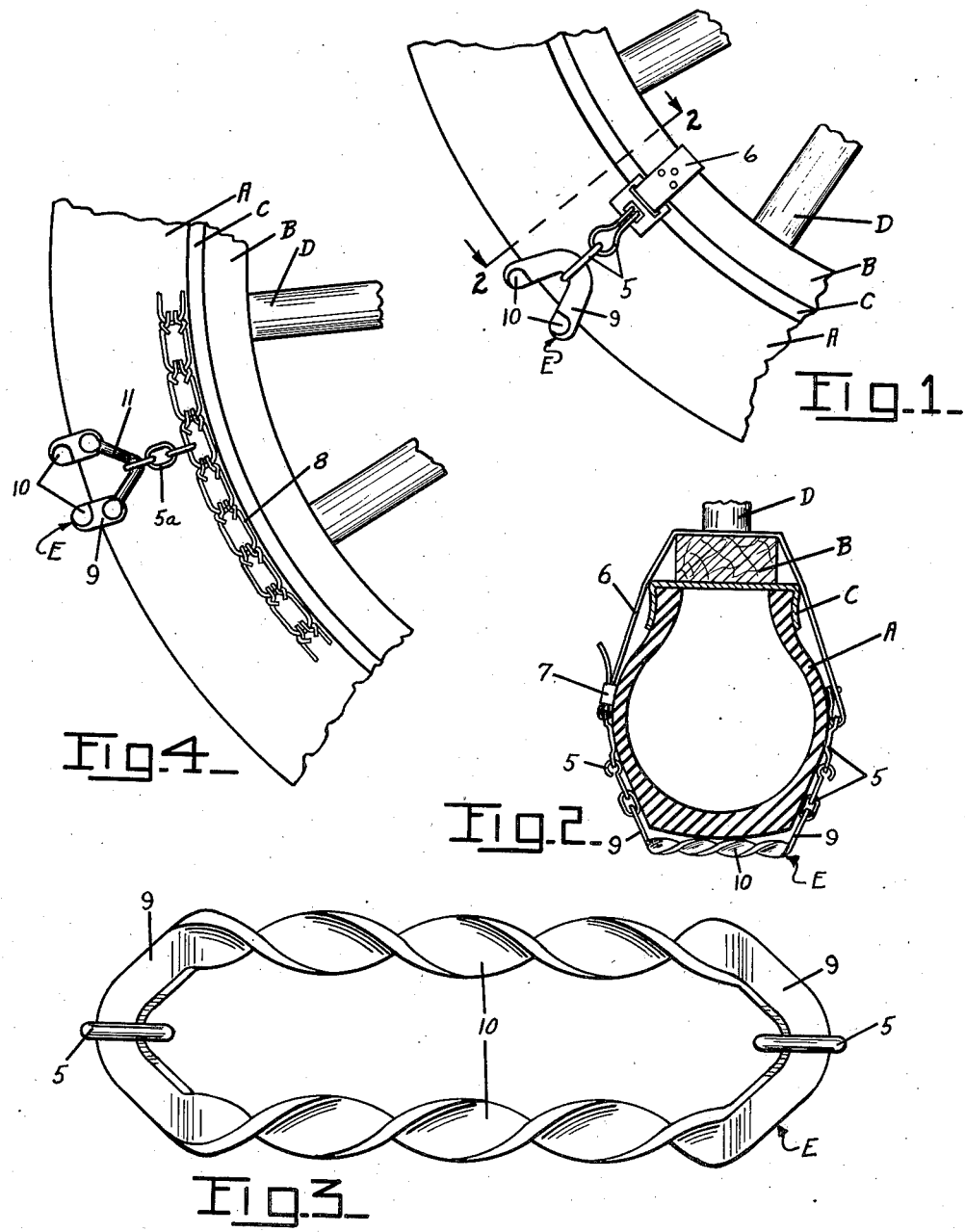

2,073,883

UNITED STATES PATENT OFFICE 2,073,883

ANTISKID DEVICE

Corey L. Russell, Milwaukee, Wis.

Application November 27, 1935, Serial No. 51,750

2 Claims. (Cl. 152—14)

This invention relates to means for preventing skidding of motor vehicles on icy or slippery road surfaces and for increasing the tractive power of the wheels in soft road, and the primary object is to provide a novel, efficient, and practical device for attachment to the vehicle wheel tires that will not only be comparatively simple and economical in construction, but which will also be strong and durable, and will produce a better gripping action on the road surfaces than other devices which have come to my attention. A further object is to so design the device that it will have a maximum wearing resistance to road contact, but will also have a minimum wearing or bruising action on the tire surfaces against which it is secured when in operation. Further and more specific objects will be disclosed in the course of the following specification, reference being had to the accompanying drawing, wherein:

Fig. 1 is a fragmentary side elevation of a vehicle wheel to which a device embodying a preferred form of the invention is applied.

Fig. 2 is an enlarged detail section on the line 2—2 in Fig. 1.

Fig. 3 is an enlarged detail plan view of the lug forming frame which embodies the essentially novel features of the invention.

Fig. 4 is a side elevation similar to Fig. 1, but illustrating a modified construction of traction lug and method of attachment.

Referring to the drawing more particularly and by reference characters, A designates the tire of a vehicle wheel having felly B, rim C, and spokes D, all of conventional or suitable construction. E designates generally the anti-skidding device or traction lug which embodies my invention, and this device may be secured in any desirable manner to the wheel. Thus, as shown in Figs. 1 and 2, the device is secured as a single and separate unit to the wheel, by link members 5 and strap 6 which encircle the tire, rim, and felly, and are releasably secured as by a suitable buckle 7. This form of attachment has advantages in that one or more of the devices can be quickly and easily applied and without the necessity of jacking up the wheel whether on a hard surface or in a deep rut. In Fig. 4 I have illustrated how the device may be secured to the wheel by being attached by links 5a to annular chains 8 which are disposed adjacent the sides of the tire. This is also a conventional method of attachment, and has certain advantages such as allowing creeping of the chain about the tire to distribute wear, and possibility of use with disc wheels. Either of the above or any other suitable means may be employed insofar as the present invention is concerned.

The lug E comprises a one piece, generally rectangular or open frame, formed of hardened steel, and when in operative position is disposed transversely across the periphery of tread surface of the tire. The ends of the frame are turned or bent upwardly, as at 9, so that the unit will more snugly embrace the tire tread, to resist lateral displacement.

The intermediate portion of the lug includes spaced, parallel bars 10 which are spirally twisted in opposite directions, as shown. The bars being formed of flat bars or strap material consequently present series of road gripping surfaces and edges, and inasmuch as the spirals turn in opposite directions, and are integrally connected, each bar portion will resist and counteract the tendency of the other to move either transversely or obliquely with respect to the tire tread surface, under which circumstances the device would not function to properly and fully resist sidewise skidding.

The life of or extent of useful service that the device will give will obviously depend to a large extent upon the size, character, and hardness of the material used. An important feature may be noted, however, in that the device may be used until it has completely worn through one of the bar portions without necessarily destroying the usefulness of the device, at least for emergency purposes, as the remaining or opposite bar will still operate and keep the securing devices connected until a new lug section is replaced. It is also to be noted that when one bar has worn through the separated ends will not be free and loose to slap or knock against the fenders and other car parts but will still be held in against the tire by the other bar.

The twists in the bars, as shown in Fig. 3, may be formed by looping the frame E through itself as many times as the number of spirals desired. In fact if the frame is cut or formed from a continuous single piece of metal that is apparently the only method in which the convolutions may be formed, unless of course the unit is cast. The frame may also be made from a length of bar metal twisted and formed as desired and then having its ends secured together as by welding. A third method is indicated in Fig. 4, wherein the twisted bars are separately formed, and are thereafter secured at their ends and as by welding, to V-shaped connector bars 11.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. An anti-skid device for a vehicle tire comprising an endless open frame for attachment against the tire tread, said frame being looped through itself whereby transversely extending opposite bar portions thereof will be formed with right and left hand spiral threads.

2. An anti-skid device for a vehicle tire comprising an endless open frame for attachment against the tire tread, said frame being looped through itself whereby transversely extending opposite bar portions thereof will be formed with right and left hand spiral threads, and the outer ends of the frame being bent angularly upwardly to laterally embrace the tread portion of the tire.

COREY L. RUSSELL.